(12) United States Patent
Kwon

(10) Patent No.: US 7,932,209 B2
(45) Date of Patent: Apr. 26, 2011

(54) SOLID MATTER A, LIQUID MATTER B PRODUCED BY USING THE A, LIQUID HEATING MATTER PRODUCED BY USING THE B AND METHOD FOR PRODUCING THE HEATING MATTER

(76) Inventor: Dong-Soon Kwon, Gyeonggi-do (KR)

( * ) Notice: Subject to any disclaimer, the term of this patent is extended or adjusted under 35 U.S.C. 154(b) by 1263 days.

(21) Appl. No.: 10/534,549

(22) PCT Filed: Nov. 7, 2003

(86) PCT No.: PCT/KR03/02375
§ 371 (c)(1),
(2), (4) Date: May 6, 2005

(87) PCT Pub. No.: WO2004/041959
PCT Pub. Date: May 21, 2004

(65) Prior Publication Data
US 2006/0003890 A1    Jan. 5, 2006

(30) Foreign Application Priority Data
Nov. 8, 2002   (KR) .................. 10-2002-0069321

(51) Int. Cl.
*C01B 31/08* (2006.01)
(52) U.S. Cl. ........ 502/425; 502/400; 502/151; 502/412; 502/407; 502/418; 588/251
(58) Field of Classification Search ............... None
See application file for complete search history.

(56) References Cited

FOREIGN PATENT DOCUMENTS

| | | |
|---|---|---|
| JP | 53071691 A | 6/1978 |
| JP | 09075388 A2 | 3/1997 |
| JP | 2001199835 A2 | 7/2001 |
| KR | 20058524 A | 10/2000 |

OTHER PUBLICATIONS

PCT International Preliminary Examination Report received in corresponding PCT Application No. PCT/KR2003/002375 mailed on Mar. 16, 2005.
PCT International Search Report received in corresponding PCT Application No. PCT/KR2003/002375 mailed on Feb. 24, 2004.

*Primary Examiner* — Melvin C Mayes
*Assistant Examiner* — Smita Patel
(74) *Attorney, Agent, or Firm* — LRK Patent Law Firm

(57) ABSTRACT

Disclosed are a liquid heating element and a method for production thereof, and more particularly a solid ingredient A, a liquid ingredient B produced from the solid ingredient A, a liquid heating element produced from the liquid ingredient B and a method for producing the liquid heating element. The solid ingredient is produced by heating activated carbon, kaolin, copper sulfide and phosphoric acid ($H_3PO_4$) to a temperature ranging from 1,000 to 1,200° C. The liquid ingredient H is produced by mixing the solid ingredient A with silicon powder and distilled water and heating the mixture. The liquid heating element is produced by mixing the liquid ingredient B with ethylene glycol, leaving the mixture and then filtering the mixture. Since the liquid heating element is very stable and generates heat with minimum power consumption, it can be applied to various heat management systems.

25 Claims, No Drawings

SOLID MATTER A, LIQUID MATTER B PRODUCED BY USING THE A, LIQUID HEATING MATTER PRODUCED BY USING THE B AND METHOD FOR PRODUCING THE HEATING MATTER

TECHNICAL FIELD

The present invention relates to a liquid heating element and a method for production thereof, and more particularly to a solid ingredient A, a liquid ingredient B produced from the solid ingredient A, a liquid heating element produced from the liquid ingredient B and a method for producing the liquid heating element.

BACKGROUND ART

In general, heating elements are classified into linear, planar and liquid heating elements. A linear heating element is comprised of nichrome wire placed at regular intervals and mounted inside a heating apparatus, such as an electric heat mat. Korean Patent Publication No. 96-7905 discloses a carbon fiber based linear heating element for use in an electric heat mat. The disclosed heating element comprises a conductive part made out of an extremely thin carbon fiber, an insulator covering the conductive part and a coating layer, such as silicon, having superior heat resistance and applied on the outer surface of the insulator.

A planar heating element consists of a heating material coating which is applied on an entire surface of an electric heating apparatus having a predetermined area and generates heat when electric power is supplied. For example, such a planar heating element can be prepared by uniformly coating fine ceramic particles and conductive carbon particles on a fabric cloth using a computer device and polymerizing the coated particles. Korean Patent No. 356309 discloses a planar heating element having a conductive layer with a silk-screen printed conductive ink, which can ensure constant heat generation for providing a highly reliable heating product. This patent eliminates a process of sewing a copper plate on a fabric cloth and prevents nonuniformity of a resistance caused due to failure to uniformly coat the carbon particles on the fabric cloth.

Planar heating elements are recognized as high tech new materials that cause substantially no danger or functional problem in electric products, as compared to conventional linear heating elements using nichrome heating wire.

While many linear and planar heating elements have been developed, liquid heating elements have not been actively studied or developed. Only techniques relating to a heater or heating element that generates its own heat without flame by an exothermic chemical reaction and a heating container (hot can) utilizing the same are known with respect to liquid heating elements. U.S. Pat. Nos. 5,609,786, 5,465,707, 5,205,277 (EP 0564680A), U.S. Pat. Nos. 4,809,673 and 4,559,921 and Korean Patent Publication Nos. 2000-199720, 1995-7752 and 199424131 disclose the hydration reaction of CaO for generating heat in a heating container. U.S. Pat. No. 4,949,702 and Korean Patent Publication Nos. 1994-1060 and 1987-10838 disclose a self-heating container having a metal oxide heater therein Also, U.S. Pat. Nos. 5,018,505, 5,611,329, 5,443,056, 5,355,869, 5,299,556, 5,220,909, 5,117,809, 4,819,612, 4,522,190 and 4,751,119 and Korean Patent Publication Nos. 2000-198025 and 1998-178091 disclose a heating container using solid metal powder and an oxidizing agent or a liquid reactant.

As stated above, no liquid heating element useful for various heat management systems has been available to date. There is an increasing demand for such a liquid heating element.

DISCLOSURE OF THE INVENTION

Therefore, the present invention has been made to solve the problems occurring in the prior art and meet the above-mentioned demand. It is an object of the present invention to provide a liquid heating element.

Another object of the present invention is to provide a solid ingredient A for producing the liquid heating element.

Still another object of the present invention is to provide a liquid ingredient B for producing the liquid heating element.

Still another object of the present invention is to provide a method for producing the liquid heating element.

Still another object of the present invention is to provide a method for heat management using the liquid heating element.

Still another object of the present invention is to provide a heat management system using the liquid heating element.

In accordance with an aspect of the present invention for accomplishing the above objects, there is provided a solid ingredient A obtained by heating a mixture of activated carbon, kaolin, copper sulfide and phosphoric acid ($H_3PO_4$) to a temperature ranging from 1,000 to 1,200° C.

In this aspect of the invention, activated carbon is added in an amount of 25 to 70 parts by weight to produce the solid ingredient A. Kaolin, copper sulfide and phosphoric acid are added in amounts varying depending on the amount of activated carbon.

3 to 20 parts by weight of kaolin, 4 to 20 parts by weight of copper sulfide and 55 to 110 parts by weight of phosphoric acid are added based on 40 parts by weight of activated carbon in order to form a mixture which will be heated to produce the solid ingredient A.

Diatomaceous earth can be used in place of kaolin to produce the solid ingredient A.

The activated carbon, kaolin, copper sulfide and phosphoric acid are mixed together and left for a predetermined period of time before being heated.

The mixture is heated in the substantial absence of oxygen to produce the solid ingredient A.

In accordance with another aspect of the present invention, there is provided a liquid ingredient B obtained by mixing the solid ingredient A with silicon powder and water and heating the resulting mixture.

When 30 parts by weight of the solid ingredient A is added, 5 to 35 parts by weight of silicon powder and 300 to 850 parts by weight of water are added and mixed with the solid ingredient A to produce the liquid ingredient B.

The solid ingredient A, silicon powder and water are heated at a temperature ranging from 90 to 110° C. to produce the liquid ingredient B.

In accordance with still another aspect of the present invention, there is provided a liquid heating element produced by mixing the liquid ingredient B with ethylene glycol, leaving the mixture for a predetermined period of time and filtering the mixture.

When 650 parts by weight of the liquid ingredient B is added, 30 to 50 parts by weight of ethylene glycol is added and mixed with the liquid ingredient B to produce the liquid heating element.

The mixture of the liquid ingredient B and ethylene glycol is left for 15 to 30 hours to produce the liquid heating element.

In accordance with still anther aspect of the present invention, there is provided a method for producing a liquid heating element, which comprises the steps of preparing the solid ingredient A from activated carbon, kaolin, copper sulfide and phosphoric acid ($H_3PO_4$), preparing the liquid ingredient B from the solid ingredient A, silicon powder and water, mixing the liquid ingredient B with ethylene glycol in a predetermined ratio and leaving the mixture for a predetermined period of time, and filtering the mixture.

The step of preparing the solid ingredient A includes heating the activated carbon, kaolin, copper sulfide and phosphoric acid ($H_3PO_4$) to a temperature ranging from 1,000 to 1,200° C. and grinding a solid obtained during the heating step.

The step of preparing the solid ingredient A further includes leaving the activated carbon, kaolin, copper sulfide and phosphoric acid before heating.

Diatomaceous earth can be used in place of kaolin in the step of preparing the solid ingredient A.

The activated carbon is added in an amount of 25 to 70 parts by weight to produce the solid ingredient A. Kaolin, copper sulfide and phosphoric acid are added in amounts varying depending on the amount of activated carbon.

3 to 20 parts by weight of kaolin, 4 to 20 parts by weight of copper sulfide and 55 to 110 parts by weight of phosphoric acid are added based on 40 parts by weight of activated carbon.

The mixture is heated in the substantial absence of oxygen to produce the solid ingredient A.

The grinding step grinds a solid obtained during the heating step into particles of less than 10 μm.

The step of preparing the liquid ingredient B includes mixing the solid ingredient A with silicon powder and water and heating the mixture.

When 30 parts by weight of the solid ingredient A is added, 5 to 35 parts by weight of silicon powder and 300 to 850 parts by weight of water are added and mixed with the solid ingredient A to produce the liquid ingredient B.

The mixture of the solid ingredient A with silicon powder and water is heated at a temperature ranging from 90 to 110° C. to produce the liquid ingredient B.

The mixture of the liquid ingredient B and ethylene glycol is left for 15 to 30 hours to produce the liquid heating element.

When 650 parts by weight of the liquid ingredient B is added, 30 to 50 parts by weight of ethylene glycol is added and mixed with the liquid ingredient B to produce the liquid heating element.

In accordance with still another aspect of the present invention, there is provided a liquid heating element produced by the above method.

In accordance with still another aspect of the present invention, there is provided a heat management method using a liquid heating element produced by any of the above methods.

In accordance with still another aspect of the present invention, there is provided a heat management system using a liquid heating element produced by any of the above methods.

The inventor has conceived a liquid heating element with improved effects through repeated trials and studies about heating elements.

According to the present invention, the solid ingredient A is produced by mixing activated carbon, kaolin, copper sulfide and phosphoric acid ($H_3PO_4$) in a predetermined ratio and heating the mixture to cause a chemical reaction. It is possible to use diatomaceous earth in place of kaolin. The solid ingredient A is grinded and mixed with silicon powder and water in a predetermined ratio. The resulting mixture is heated to produce the liquid ingredient B. The liquid ingredient B is mixed with ethylene glycol in a predetermined ratio. The mixture is left for a certain period of time and then filtered to obtain a liquid heating element.

In other words, the present invention provides the solid ingredient A, the liquid ingredient B and a liquid heating element produced using the solid ingredient A and the liquid ingredient B. The solid ingredient A is obtained by heating activated carbon, kaolin (or diatomaceous earth), copper sulfide and phosphoric acid ($H_3PO_4$) to a temperature ranging from 1,000 to 1,200° C. The liquid ingredient B is obtained by mixing the ingredient A with silicon powder and distilled water and heating the mixture. The liquid heating element is obtained by mixing the liquid ingredient B with ethylene glycol, leaving the mixture for a predetermiined period of time and filtering the mixture.

The components, such as activated carbon, kaolin (or diatomaceous earth), copper sulfide (CuS), phosphoric acid ($H_3PO_4$), silicon powder, distilled water and ethylene glycol ($HOCH_2CH_2OH$), which are used to produce the solid ingredient A, liquid ingredient B and liquid heating element of the present invention, have the following properties and functions.

Kaolin is also called china clay. It consists essentially of kaolinite $Al_2O_3 \cdot 2SiO_2 \cdot 2H_2O$ and halloysite $Al_2O_3 \cdot SiO_2 \cdot 4H_2O$. Due to its high adsorptivity, kaolin can be used in medical cosmetics (for treatment of scars or improvement of skin conditions) or liquid raw material.

Diatomaceous earth, which can be used in place of kaolin, is available from both sea water and fresh water. Good quality diatomaceous earth contains more than 90% SiO2. Diatomaceous earth is generally used as an absorbent and catalyst carrier for an explosive (such as nitroglycerin), a degreasing agent, an adsorbent, a filter, a plastic thermal insulator, a cement admixing agent and an abrasive.

Phosphoric acid ($H_3PO_4$) refers to a series of acids $mP_2O_5 \cdot nH2O$ resulting from the hydration of phosphorus pentoxide $P_2O_5$. Phosphoric acid includes metaphosphate, pyrophosphate, orthophosphate, triphosphate and tetraphosphate. Also, it includes a polymetaphosphate group obtained by the polymerization of metaphosphate. As colorless and odorless liquid having high viscosity, phosphoric acid has a melting point of 42.35° C. and a weight of 1.834 and possesses deliquescence. 542 g phosphoric acid melts in 100 g water at a temperature of 20° C.

Phosphoric acid is non-volatile. It changes to pyrophosphate or polyphosphoric acid when heated and to metaphosphate when further heated. It melts in alcohol and intensively erodes metals and oxides thereof. In laboratories, phosphoric acid is formed by reacting phosphorus pentoxide generated by the combustion of phosphorus in oxygen or air with water. In industries, a dry process using combustion and hydration of the element phosphorus and a wet process using sulfuric acid decomposition of phosphorite are used to form phosphoric acid.

Silicon (Si) is in an amorphous or a crystalline form. Amorphous silicon is brown powder, while crystalline silicon is a dark bluish-black octahedron diamond structure distorted to a needle shape or a plate shape. silicon and germanium are by far the most widely used semiconductors. Although being stable in air at room temperature, silicon reacts with fluorine. When heated, silicon also reacts with chlorine, oxygen and nitrogen. It reacts with carbon at a high temperature to form silicon carbide. It is slowly oxidized by aqua regia to become silicon dioxide. While being easily dissolved in a mixture of a hydrofluoric acid and a nitric acid and an alkali hydroxide solution, it does not erode in any other acid.

When sodium metal reacts with alkyl halide, an organosilicic compound can be produced. Generally, silicon is obtained by reducing a washed and crushed silica stone using a charcoal or a coke electric oven. Silicon obtained thusly has a purity of 99%.

Ethylene glycol, as one of dihydric alcohols, can be simply called glycol.

Ethylene glycol has a molecular weight of 62.07, a melting point of −12.6° C., a boiling point of 197.7° C., a weight of 1.1131 and a chemical structure of $HO(CH_2)_2OH$. As viscous sweet colorless liquid with good moisture absorbency, ethylene glycol is mixed with water, ethanol, acetic acid or the like.

The present invention provides a method for producing a liquid heating element, comprising the steps of preparing the solid ingredient A from activated carbon, kaolin, copper sulfide and phosphoric acid ($H_3PO_4$), preparing the liquid ingredient B from the solid ingredient A, silicon powder and water, mixing the liquid ingredient B with ethylene glycol in a predetermined ratio and leaving the mixture for a predetermined period of time, and filtering the mixture.

The step of preparing the solid ingredient A includes mixing the activated carbon, kaolin, copper sulfide and phosphoric acid ($H_3PO_4$) in a predetermined ratio and leaving the mixture for over one hour. The mixed components generate heat due to certain reaction including their ionization. The activated carbon, kaolin and copper sulfide are used in powder state, whereas the phosphoric acid is used in liquid state.

Although the solid ingredient A can be produced when the activated carbon, kaolin, copper sulfide and phosphoric acid are present even in small amounts, it is preferable to add the activated carbon in an amount of 25 to 70 parts by weight. The amounts of kaolin, copper sulfide and phosphoric acid vary depending on the amount of the activated carbon. Preferably, when 40 parts by weight of activated carbon is added, 3 to 20 parts by weight of kaolin, 4 to 20 parts by weight of copper sulfide and 55 to 110 parts by weight of phosphoric acid are added and mixed to produce the solid ingredient A. More preferably, 35 to 65 parts by weight of activated carbon can be added. At this time, 4 to 10 parts by weight of kaolin, 5 to 15 parts by weight of copper sulfide and 64 to 92 parts by weight of phosphoric acid can be added based on 40 parts by weight of activated carbon.

If activated carbon is absent or present in a very small amount, a liquid heating element produced using the activated carbon will have a small deviation in temperature increase or will greatly increase the power consumption. On the other hand, a large amount of activated carbon is hardly dissolved and does not influence the power consumption. Therefore, it is not desirable to add the activated carbon in an amount of more than 70 parts by weight.

The more the amount of kaolin added, the less the power consumption. When kaolin is added in an amount of more than 20 parts by weight based on 40 parts by weight of activated carbon, it can hardly produce its effect. The same can be said when diatomaceous earth is used instead of kaolin.

If copper sulfide is added in a small amount or an amount exceeding the optimum range, the temperature increase deviation will be considerably reduced and the power consumption will be reduced and then increased according to the amount of copper sulfide. The amount range as mentioned above is most ideal to produce the effect of copper sulfide.

Phosphoric acid serves as a catalyst for ionizing the activated carbon, kaolin and copper sulfide. When the amount of phosphoric acid is too small, the activated carbon, kaolin and copper sulfide do not mingled with each another or cause ion changes. When a mixture of these components is heated, activated carbon excessively burns. To the contrary, when the amount of phosphoric acid is too large, it takes much time to heat the mixture. Also, it is difficult to obtain a stable liquid heating element because of a large amount of the P element.

While the mixture of the above components is being left, the heat generated by the mixture drops off. The mixture is then heated to a temperature of 1,000 to 1,200° C. in the substantial absence of oxygen to cause chemical reactions of the mixed components. When the mixture is 100 to 150 g, it is heated for about 10 to 20 minutes to produce the solid ingredient A. Preferably, the solid ingredient A should be grinded into fine particles of less than 10 μm so that it can be easily dissolved in water.

In order to prepare the liquid ingredient B, the solid ingredient A is mixed with silicon powder and water. The mixture is then heated. When the solid ingredient A is used in an amount of 30 parts by weight, it is preferable to add 5 to 35 parts by weight of silicon powder and 300 to 850 parts by weight of water. If silicon powder is not added, the electric reaction of a resulting liquid heating element will be unstable and the instantaneous rate of change of the power consumption will be great. If silicon powder is added, the electric reaction of the liquid heating element will be as stable as that of a metal. If the amount of silicon powder is excessively small or large, the power consumption will be increase Preferably, the mixture should be heated at a temperature ranging from 90 to 110° C., to obtain the liquid ingredient B. More preferably, a 1,000 cc mixture of the solid ingredient A, silicon powder and water is heated at 100° C. until it is reduced to 650 cc.

The obtained liquid ingredient B is mixed with ethylene glycol in a predetermined ratio and left for 15 to 30 hours. It is most preferable to add 30 to 50 parts by weight of ethylene glycol based on 650 parts by weight of the liquid ingredient B. Also, it is preferable to add ethylene glycol before the liquid ingredient B is cooled and to leave them fur about 24 hours in order to induce the complete admixture of the liquid ingredient B with ethylene glycol and facilitate the removal of sediments.

Ethylene glycol serves as antifreeze. Although having a slight heat keeping effect, it does not greatly influence the function of the liquid heating element. Ethylene glycol is added in such an amount that the liquid heating element freezes at −25 to −35° C. Since the amount of ethylene glycol can vary according to the place where the liquid heating element is used, there is no problem in using the liquid heating element even in cold regions.

The left mixture of the liquid ingredient B with ethylene glycol is filtered to remove sediments, thereby obtaining the liquid heating element according to the present invention.

The liquid heating element produced by the above-mentioned method is highly stable because it has neither metal corrosiveness nor flammability. Since it produces great amounts of heat with less power consumption, it can be effectively used in various heat management methods and systems.

BEST MODE FOR CARRYING OUT THE INVENTION

The following examples illustrate the invention without in any way limiting its scope.

Example 1

Preparation of Solid Ingredients $A_C$ ($A_{C1}$, $A_{C2}$, $A_{C3}$, $A_{C4}$, $A_{C5}$) with Different Amounts of Activated Carbon, Liquid Ingredients $B_C$ ($B_{C1}$, $B_{C2}$, $B_{C3}$, $B_{C4}$, $B_{C5}$) Using the Solid Ingredients $A_C$, and Liquid Heating Elements $_C$ Using the Liquid Ingredients $B_C$ 1-1. 0 g activated carbon (DYcarbon Corporation), 7 g kaolin (Oriental Chem. Ind.), 10 g copper sulfide (Junsei Chemical Co., Japan) and 10 cc (about 18.3 g) phosphoric acid (Dongbu Hannong Chemical) were mixed together. The temperature of the mixture was increased to 40 to 60° C. due to the exothermic reaction of the above components. The mixture was left for over one hour until it cooled. When the mixture was completely cooled, it was heated at 1,150° C. in the substantial absence of oxygen for 12 minutes to become a solid. The resulting solid was grinded into powder having a particle size of less than 10 μm using a grinder, thereby producing a solid ingredient $A_{C1}$.

20 parts by weight of silicon powder and water, preferably 650 parts by weight of distilled water, were added and mixed with 30 parts by weight of the solid ingredient $A_{C1}$. The mixture was heated at 100° C. for one hour to produce a liquid ingredient $B_{C1}$. 40 parts by weight of ethylene glycol was added before the liquid ingredient $B_{C1}$ cooled. The mixture of the liquid ingredient Bc, with ethylene glycol was left for 24 hours. The mixture was then filtered to remove sediments, thereby obtaining a liquid heating element $_{C1}$.

1-2. A solid ingredient $A_{C2}$ a liquid ingredient $B_{C2}$ and a liquid heating element $_{C2}$ were produced by the same method as explained in 1-1, with the only difference being that 25 g activated carbon and 20 cc (about 36.7 g) phosphoric acid were used.

1-3. A solid ingredient $A_{C3}$, a liquid ingredient $B_{C3}$ and a liquid heating element $_{C3}$ were produced by the same method as explained in 1-1, with the only difference being that 40 g activated carbon and 40 cc (about 73.4 g) phosphoric acid were used.

1-4. A solid ingredient AA, a liquid ingredient $B_{C4}$ and a liquid heating element $_{C3}$ were produced by the same method as explained in 1-1, with the only difference being that 50 g activated carbon and 50 cc (about 92 g) phosphoric acid were used.

1-5. A solid ingredient $A_{C5}$, a liquid ingredient $B_{C5}$ and a liquid heating element $_{C5}$ were produced by the same method as explained in 1-1, with the only difference being that 60 g activated carbon and 60 cc (about 110 g) phosphoric acid were used.

Experiment Example 1

In order to study the influence of activated carbon upon the functions of a liquid heating element according to its amount in the solid ingredient A, it was observed how the heat generated when power is supplied to the liquid heating elements $_{c1}$, $_{c2}$, $_{c3}$, $_{c4}$ and $_{c5}$ produced in Example 1 causes temperature changes in 25° C., 550 cc water with lapse of time (every minute). The results are shown in Tables 1 through 5.

TABLE 1

| | Liquid heating element$_{C1}$ | | | | |
| --- | --- | --- | --- | --- | --- |
| | Time (min) | | | | |
| | 1 | 2 | 3 | 4 | 5 |
| Temperature (° C.) | 42 | 69 | 95 | 109 | 109 |
| Power (Watt) | 831 | 939 | 1,000 | 950 | 940 |
| Current (A) | 3.87 | 4.32 | 4.60 | 4.36 | 4.30 |

TABLE 2

| | Liquid heating element$_{C2}$ | | | | | | |
| --- | --- | --- | --- | --- | --- | --- | --- |
| | Time (min) | | | | | | |
| | 1 | 2 | 3 | 4 | 5 | 6 | 7 |
| Temperature (° C.) | 23 | 25 | 27 | 28 | 30 | 31 | 33 |
| Power (Watt) | | 54 | 55 | 57 | 59 | 60 | 62 |
| Current (A) | | 0.24 | 0.25 | 0.26 | 0.26 | 0.27 | 0.28 |

TABLE 3

| | Liquid heating element$_{C3}$ | | | | | | |
| --- | --- | --- | --- | --- | --- | --- | --- |
| | Time (min) | | | | | | |
| | 1 | 2 | 3 | 4 | 5 | 6 | 7 |
| Temperature (° C.) | 38 | 53 | 69 | 84 | 96 | 106 | 109 |
| Power (Watt) | 468 | 535 | 589 | 633 | 659 | 657 | 643 |
| Current (A) | 2.08 | 2.37 | 2.62 | 2.82 | 2.93 | 2.91 | 2.85 |

TABLE 4

Liquid heating element$_{C4}$

| | Time (min) | | | | | |
|---|---|---|---|---|---|---|
| | 1 | 2 | 3 | 4 | 5 | 6 |
| Temperature (° C.) | 40 | 57 | 74 | 90 | 103 | 107 |
| Power (Watt) | 527 | 592 | 643 | 705 | 719 | 695 |
| Current (A) | 2.38 | 2.63 | 2.91 | 3.19 | 3.23 | 3.15 |

TABLE 5

Liquid heating element$_{C5}$

| | Time (min) | | | | | | |
|---|---|---|---|---|---|---|---|
| | 1 | 2 | 3 | 4 | 5 | 6 | 7 |
| Temperature (° C.) | 36 | 54 | 73 | 91 | 106 | 109 | 108 |
| Power (Watt) | 567 | 650 | 710 | 751 | 766 | 736 | 723 |
| Current (A) | 2.60 | 2.97 | 3.27 | 3.42 | 3.47 | 3.41 | 3.31 |

As is clear from the above tables, when activated carbon is absent or present in a very small amount, a liquid heating element produced using the activated carbon has a small deviation in temperature increase or greatly increases the power consumption. On the other hand, an excessively great amount of activated carbon is hardly dissolved and does not influence the power consumption. Therefore, it is undesirable and meaningless to add the activated carbon in an amount of more than 70 parts by weight. The activated carbon should be added in an amount of preferably 25 to 70 parts by weight, more preferably 35 to 65 parts by weight to produce the most ideal effect.

Example 2

Preparation of Solid Ingredients $A_K$ ($A_{K1}$, $A_{K2}$, $A_{K3}$, $A_{K4}$, $A_{K5}$) with Different Amounts of Kaolin, Liquid Ingredients $B_K$ ($B_{K1}$, $B_{K2}$, $B_{K3}$, $B_{K4}$, $B_{K5}$) Using the Solid Ingredients $A_K$, and Liquid Heating Elements $_K$ using the Liquid Ingredients $B_K$ 2-1. 40 g activated carbon (DYcarbon Corporation), 0 g kaolin (Oriental Chem. Ind.), 10 g copper sulfide (Junsei Chemical Co., Japan) and 50 cc (about 92 g) phosphoric acid (Dongbu Hannong Chemical) were mixed together. The temperature of the mixture was increased to 40 to 60° C. due to the exothermic reaction of the above components. The mixture was left for over one hour until it cooled. When the mixture was completely cooled, it was heated at 1,150° C. in the substantial absence of oxygen for 12 minutes to become a solid. The resulting solid was grinded into powder having a particle size of less than 10 μm using a grinder, thereby producing a solid ingredient $A_{K1}$.

20 parts by weight of silicon powder and water, preferably 650 parts by weight of distilled water, were added and mixed with 30 parts by weight of the solid ingredient $A_{K1}$. The mixture was heated at 100° C. for one hour to produce a liquid ingredient $B_{K1}$. 40 parts by weight of ethylene glycol was added before the liquid ingredient $B_{K1}$ cooled. The mixture of the liquid ingredient $B_{K1}$ with ethylene glycol was left for 24 hours. The mixture was then filtered to remove sediments, thereby obtaining a liquid heating element $_{K1}$.

2-2. A solid ingredient $A_{K2}$, a liquid ingredient $B_{K2}$ and a liquid heating element $_{K2}$ were produced by the same method as explained in 2-1, with the only difference being that 3 g kaolin was used.

2-3. A solid ingredient $A_{K3}$, a liquid ingredient $B_{K3}$ and a liquid heating element $_{K3}$ were produced by the same method as explained in 2-1, with the only difference being that 6 g kaolin was used.

2-4. A solid ingredient $A_{K4}$, a liquid ingredient $B_{K4}$ and a liquid heating element $_{K4}$ were produced by the same method as explained in 2-1, with the only difference being that 10 g kaolin was used.

2-5. A solid ingredient $A_{K5}$, a liquid ingredient $B_{K5}$ and a liquid heating element $_{K5}$ were produced by the same method as explained in 2-1, with the only difference being that 20 g kaolin was used.

Experiment Example 2

In order to study the influence of kaolin upon the functions of a liquid heating element according to its amount in the solid ingredient A, it was observed how the heat generated when power is supplied to the liquid heating elements $_{K1}$, $_{K2}$, $_{K3}$, $_{K4}$ and $_{K5}$ produced in Example 2 causes temperature changes in 25° C., 550 cc water with lapse of time (every minute). The results are shown in Tables 6 through 10.

TABLE 6

Liquid heating element$_{K1}$

| | Time (min) | | |
|---|---|---|---|
| | 1 | 2 | 3 |
| Temp (° C.) | 58 | 99 | 109 |
| Power (Watt) | 1,373 | 1,484 | 1,331 |
| Current (A) | 6.26 | 6.73 | 6.11 |

TABLE 7

Liquid heating element$_{K2}$

| | Time (min) | | | | |
|---|---|---|---|---|---|
| | 1 | 2 | 3 | 4 | 5 |
| Temp (° C.) | 45 | 66 | 87 | 104 | 110 |
| Power (Watt) | 673 | 763 | 841 | 864 | 838 |
| Current (A) | 3.02 | 3.43 | 3.74 | 3.85 | 3.72 |

TABLE 8

Liquid heating element$_{K3}$

| | Time (min) | | | | | | | | |
|---|---|---|---|---|---|---|---|---|---|
| | 1 | 2 | 3 | 4 | 5 | 6 | 7 | 8 | 9 |
| Temp (° C.) | 32 | 43 | 55 | 68 | 81 | 94 | 104 | 108 | 108 |
| Power (Watt) | 355 | 396 | 446 | 498 | 538 | 572 | 589 | 593 | 588 |
| Current (A) | 1.51 | 1.74 | 1.95 | 2.18 | 2.35 | 2.51 | 2.58 | 2.60 | 2.57 |

TABLE 9

Liquid heating element$_{K4}$

| | Time (min) | | | | | | | | |
|---|---|---|---|---|---|---|---|---|---|
| | 1 | 2 | 3 | 4 | 5 | 6 | 7 | 8 | 9 |
| Temp (° C.) | 36 | 47 | 59 | 71 | 82 | 93 | 101 | 106 | 108 |
| Power (Watt) | 352 | 396 | 440 | 479 | 512 | 536 | 550 | 542 | 542 |
| Current (A) | 1.56 | 1.76 | 1.95 | 2.13 | 2.28 | 2.38 | 2.44 | 2.42 | 2.41 |

TABLE 10

Liquid heating element$_{K5}$

| | Time (min) | | | | | | | | | |
|---|---|---|---|---|---|---|---|---|---|---|
| | 1 | 2 | 3 | 4 | 5 | 6 | 7 | 8 | 9 | 10 |
| Temp (° C.) | 31 | 35 | 39 | 43 | 47 | 51 | 55 | 59 | 63 | 67 |
| Power (Watt) | 134 | 142 | 150 | 158 | 166 | 174 | 180 | 187 | 194 | 201 |
| Current (A) | 0.58 | 0.62 | 0.65 | 0.69 | 0.72 | 0.75 | 0.79 | 0.82 | 0.85 | 0.88 |

As is clear from the above tables, the power consumption is lowered with the increase of the amount of kaolin. When kaolin is added in an amount of more than 20 parts by weight based on 40 parts by weight of activated carbon, it can barely produce any effects. Kaolin should be added in an amount of preferably 3 to 20 parts by weight, more preferably 4 to 10 parts by weight to produce the most ideal effect Example 3

Preparation of Solid Ingredients $A_{Cu}$ ($A_{Cu1}$, $A_{Cu3}$, $A_{Cu4}$, $A_{Cu5}$) with Different Amounts of Copper Sulfide, Liquid Ingredients $B_{Cu}$ ($B_{Cu1}$, $B_{Cu2}$, $B_{Cu3}$, $B_{Cu4}$, $B_{Cu5}$) Using the Solid Ingredients $A_{Cu}$, and Liquid Heating Elements $_{Cu}$ Using the Liquid Ingredients $B_{Cu}$.

3-1. 40 g activated carbon (DYcarbon Corporation), 6 g kaolin (Oriental Chem. Ind.), 0 g copper sulfide (Junsei Chemical Co., Japan) and 50 cc (about 92 g) phosphoric acid (Dongbu Hannong Chemical) were mixed together. The temperature of the mixture was increased to 40 to 60° C. due to the exothermic reaction of the above components. The mixture was left for over one hour until it cooled. When the mixture was completely cooled, it was heated at 1,150° C. in the substantial absence of oxygen for 12 minutes to become a solid. The resulting solid was grinded into powder having a particle size of less than 10 μm using a grinder, thereby producing a solid ingredient $A_{Cu1}$.

20 parts by weight of silicon powder and 650 parts by weight of water were added and mixed with 30 parts by weight of the solid ingredient A, The mixture was heated at 100° C. for one hour to produce a liquid ingredient $B_{Cu1}$. 40 parts by weight of ethylene glycol was added before the liquid ingredient $B_{Cu1}$ cooled. The mixture of the liquid ingredient $B_{Cu1}$ with ethylene glycol was left for 24 hours. The mixture was then filtered to remove sediments, thereby obtaining a liquid heating element $_{Cu1}$.

3-2. A solid ingredient $A_{Cu2}$, a liquid ingredient $B_{Cu2}$ and a liquid heating element $_{Cu2}$ were produced by the same method as explained in 3-1, with the only difference being that 5 g copper sulfide was used.

3-3. A solid ingredient $A_{Cu3}$, a liquid ingredient $B_{Cu3}$ and a liquid heating element $_{Cu3}$ were produced by the same method as explained in 3-1, with the only difference being that 10 g copper sulfide was used.

3-4. A solid ingredient $A_{Cu4}$, a liquid ingredient $B_{Cu4}$ and a liquid heating element $_{Cu4}$ were produced by the same method as explained in 3-1, with the only difference being that 20 g copper sulfide was used.

3-5. A solid ingredient $A_{Cu5}$, a liquid ingredient Bark and a liquid heating element $_{Cu5}$ were produced by the same method as explained in 3-1, with the only difference being that 30 g copper sulfide was used.

Experiment Example 3

In order to study the influence of copper sulfide upon the functions of a liquid heating element according to its amount in the solid ingredient A, it was observed how the heat generated when power is supplied to the liquid heating elements $Cu1$, $Cu2$, $Cu3$, $Cu4$ and $Cu5$ produced in Example 3 causes temperature changes in 25° C., 550 cc water with lapse of time (every minute). The results are shown in Tables 11 through 15.

TABLE 11

Liquid heating element$_{Cu1}$

| | Time (min) | | | | | | | | | |
|---|---|---|---|---|---|---|---|---|---|---|
| | 1 | 2 | 3 | 4 | 5 | 6 | 7 | 8 | 9 | 10 |
| Temp (° C.) | 29 | 37 | 46 | 56 | 65 | 74 | 83 | 92 | 99 | 104 |
| Power (Watt) | 281 | 309 | 334 | 360 | 381 | 399 | 415 | 427 | 435 | 445 |
| Current (A) | 1.17 | 1.32 | 1.40 | 1.49 | 1.58 | 1.68 | 1.73 | 1.78 | 1.82 | 1.85 |

TABLE 12

Liquid heating element$_{Cu2}$

| | Time (min) | | | | | | | | | |
|---|---|---|---|---|---|---|---|---|---|---|
| | 1 | 2 | 3 | 4 | 5 | 6 | 7 | 8 | 9 | 10 |
| Temp (° C.) | 32 | 41 | 51 | 63 | 73 | 84 | 93 | 101 | 106 | 108 |
| Power (Watt) | 305 | 341 | 380 | 415 | 448 | 476 | 491 | 504 | 508 | 499 |
| Current (A) | 1.32 | 1.49 | 1.64 | 1.80 | 1.95 | 2.07 | 2.14 | 2.20 | 2.22 | 2.18 |

TABLE 13

Liquid heating element$_{Cu3}$

| | Time (min) | | | | | | | | |
|---|---|---|---|---|---|---|---|---|---|
| | 1 | 2 | 3 | 4 | 5 | 6 | 7 | 8 | 9 |
| Temp (° C.) | 39 | 51 | 64 | 76 | 89 | 100 | 106 | 108 | 108 |
| Power (Watt) | 388 | 436 | 483 | 519 | 549 | 572 | 574 | 579 | 572 |
| Current (A) | 1.70 | 1.92 | 2.12 | 2.28 | 2.42 | 2.49 | 2.52 | 2.52 | 2.49 |

TABLE 14

Liquid heating element$_{Cu4}$

| | Time (min) | | | | | | | | | |
|---|---|---|---|---|---|---|---|---|---|---|
| | 1 | 2 | 3 | 4 | 5 | 6 | 7 | 8 | 9 | 10 |
| Temp (° C.) | 28 | 33 | 39 | 44 | 51 | 57 | 64 | 71 | 77 | 83 |
| Power (Watt) | 172 | 186 | 203 | 221 | 238 | 263 | 282 | 300 | 315 | 328 |
| Current (A) | 0.73 | 0.80 | 0.87 | 0.95 | 1.02 | 1.12 | 1.21 | 1.30 | 1.36 | 1.41 |

TABLE 15

Liquid heating element$_{Cu5}$

| | Time(min) | | | | | | | | | |
|---|---|---|---|---|---|---|---|---|---|---|
| | 1 | 2 | 3 | 4 | 5 | 6 | 7 | 8 | 9 | 10 |
| Temp (° C.) | 28 | 33 | 38 | 43 | 48 | 54 | 60 | 66 | 72 | 78 |
| Power (Watt) | 156 | 169 | 183 | 198 | 213 | 228 | 242 | 258 | 271 | 282 |
| Current (A) | 0.66 | 0.72 | 0.79 | 0.85 | 0.92 | 0.99 | 1.04 | 1.11 | 1.17 | 1.21 |

As is clear from the above tables, when copper sulfide is added in a small amount or an amount exceeding the optimum range, the temperature increase deviation is considerably reduced. Also, the power consumption is reduced and then increased according to the amount of copper sulfide. To produce the most ideal effect, copper sulfide should be added in an amount of preferably 4 to 20 parts by weight, more preferably 5 to 15 parts by weight, based on 40 parts by weight of activated carbon.

Example 4

Preparation of Liquid Ingredients $B_{Si}$ ($B_{Si1}$, $B_{Si2}$, $B_{Si3}$) with Different Amounts of Silicon Powder, and Liquid Heating Elements $_{Si}$ Using the Liquid Ingredients $B_{Si}$ 4-1. 40 g activated carbon (DYcarbon Corporation), 6 g kaolin (Oriental Chem. Ind.), 10 g copper sulfide (Junsei Chemical Co., Japan) and 40 cc (about 73.4 g) phosphoric acid (Dongbu Hannong Chemical) were mixed together. The temperature of the mixture was increased to 40 to 60° C. due to the exothermic reaction of the above components. The mixture was left for over one hour until it cooled. When the mixture was completely cooled, it was heated at 1,150° C. in the substantial absence of oxygen for 12 minutes to become a solid. The resulting solid was grinded into powder having a particle size of less than 10 μm using a grinder, thereby producing a solid ingredient A.

0 g silicon powder and 650 cc water were added and mixed with 30 g solid ingredient A. The mixture was heated at 100° C. for one hour to produce a liquid ingredient $B_{Si1}$. 39 cc ethylene glycol was added before the liquid ingredient $B_{Si1}$ cooled. The mixture of the liquid ingredient $B_{Si1}$ with ethylene glycol was left for 24 hours. The mixture was then filtered to remove sediments, thereby obtaining a liquid heating element $_{Si1}$.

4-2. A liquid ingredient $B_{Si2}$ and a liquid heating element $_{Si2}$ were produced by the same method as explained in 4-1, with the only difference being that 20 g silicon power was used.

4-3. A liquid ingredient $B_{Si3}$ and a liquid heating element $_{Si3}$ were produced by the same method as explained in 4-1, with the only difference being that 35 g silicon powder was used.

Experiment Example 4

In order to study the influence of silicon powder upon the functions of a liquid heating element according to its amount in the liquid ingredient B, it was observed how the heat generated when power is supplied to the liquid heating elements $_{si1}$, $_{si2}$ and $_{si3}$ produced in Example 4 causes temperature changes in 25° C., 550 cc water with lapse of time (every minute). The results are shown in Tables 16 through 18.

TABLE 16

Liquid heating element$_{Si1}$

| | Time (min) | | | | | | | | |
|---|---|---|---|---|---|---|---|---|---|
| | 1 | 2 | 3 | 4 | 5 | 6 | 7 | 8 | 9 |
| Temp (° C.) | 39 | 51 | 64 | 76 | 89 | 100 | 106 | 108 | 107 |
| Power (Watt) | 388 | 436 | 483 | 519 | 549 | 572 | 574 | 579 | 572 |
| Current (A) | 1.70 | 1.92 | 2.12 | 2.28 | 2.42 | 2.49 | 2.52 | 2.52 | 2.49 |

TABLE 17

Liquid heating element$_{Si2}$

| | Time (min) | | | | | | | |
|---|---|---|---|---|---|---|---|---|
| | 1 | 2 | 3 | 4 | 5 | 6 | 7 | 8 |
| Temp (° C.) | 30 | 41 | 53 | 66 | 80 | 94 | 106 | 108 |
| Power (Watt) | 332 | 378 | 421 | 475 | 513 | 554 | 570 | 558 |
| Current (A) | 1.51 | 1.73 | 1.93 | 2.16 | 2.34 | 2.52 | 2.55 | 2.53 |

TABLE 18

Liquid heating element$_{Si3}$

| | Time(min) | | | | | | | |
|---|---|---|---|---|---|---|---|---|
| | 1 | 2 | 3 | 4 | 5 | 6 | 7 | 8 |
| Temp (° C.) | 34 | 47 | 62 | 75 | 89 | 102 | 109 | 108 |
| Power (Watt) | 399 | 455 | 514 | 551 | 587 | 610 | 604 | 595 |
| Current (A) | 1.81 | 2.06 | 2.32 | 2.52 | 2.68 | 2.78 | 2.74 | 2.71 |

As is clear from the above tables, when the amount of silicon powder is excessively small or large, the power consumption is increased. When silicon powder is not added, a resulting liquid heating element shows an unstable electric reaction and causes a great instantaneous rate of change of the power consumption. If silicon powder is added, the electric reaction of the liquid heating element will be as stable as that of a metal. Therefore, a liquid ingredient B produced by adding preferably 5 to 35 parts, more preferably 15 to 30 parts by weight, of silicon powder based on 30 parts by weight of the solid ingredient A can produce a liquid heating element with the most ideal effect.

Although kaolin was used to produce the solid ingredient A in the above examples, diatomaceous earth can be used in place of kaolin. Also, the liquid ingredient B and liquid heating element obtained from the solid ingredient A with diatomaceous earth added produce the same effects as explained in the examples.

Example 5

As examples of heat management systems utilizing the liquid heating element according to the present invention, a radiator and an air conditioner, both with an embedded liquid heating element, were manufactured. Specifically, conventional indirect heating radiator and air conditioner were modified to have such a structure that the liquid heating element according to the present invention can be heated and cause convection within the channel.

Experiment example 5

In order to measure the thermal efficiency of the radiator with an embedded liquid heating element manufactured in Example 5, the radiator ("radiator 1") and a conventional indirect heating radiator ("radiator 2") were placed respectively in rooms 1 and 2 having the same size, humidity and external temperature and operated to maintain the room temperature at 40° C. The electricity consumption of each radiator for 10 hours was measured twice (20:30 to 06:30 and 09:00 to 19:00). The results are shown in Table 19.

TABLE 19

|  | First measurement | | Second measurement | |
| --- | --- | --- | --- | --- |
|  | Radiator 1 | Radiator 2 | Radiator 1 | Radiator 2 |
| Electricity (kwh) | 3.0 | 5.6 | 2.9 | 5.7 |

As is clear from the above table, the radiator 1 generates the same heat with almost half the electricity consumed by the conventional radiator 2. It is evident that the radiator 1 with the liquid heating element according to the present invention has superior thermal efficiency.

Experiment Example 6

A conventional air conditioner generates 2,041 kcal heat per hour at 2.5 kw power supply. In order to measure the thermal efficiency of the air conditioner with the embedded liquid heating element manufactured in Example 5, the air conditioner was operated in a room with dry-bulb temperature/wet-bulb temperature 20° C.±0.5/15° C.±0.5 for one hour. The results measured every 10 minutes are shown in Table 20.

TABLE 20

| | Measurements (unit: min) | | | | | | |
| --- | --- | --- | --- | --- | --- | --- | --- |
| | 10 | 20 | 30 | 40 | 50 | 60 | Average |
| Voltage V | 218.5 | 218.5 | 218.6 | 219.0 | 220.6 | 226.9 | 220.3 |
| Current A | 16.3 | 16.9 | 16.6 | 17.1 | 16.6 | 3.3 | 14.5 |
| Power factor/ | 0.999 | 0.999 | 0.999 | 1.000 | 0.970 | 0.908 | 0.979 |
| Power consumption kw | 3.556 | 3.696 | 3.627 | 3.740 | 3.560 | 0.682 | 3.143 |
| Entering dry bulb Temp ° C. | 20.0 | 19.9 | 19.9 | 20.0 | 20.1 | 20.1 | 20.0 |
| discharging dry bulb Temp ° C. | 49.0 | 48.8 | 48.6 | 48.9 | 48.9 | 49.0 | 48.9 |
| Entering wet bulb Temp ° C. | 14.9 | 15.0 | 14.9 | 15.0 | 15.1 | 15.1 | 15.0 |
| discharging Wet dry bulb Temp ° C. | 23.7 | 23.7 | 23.6 | 23.7 | 23.7 | 23.7 | 23.7 |
| Entering relative humidity % RH | 58.6 | 59.3 | 58.6 | 58.7 | 58.9 | 58.8 | 58.8 |
| discharging relative humidity % RH | 11.0 | 11.2 | 11.1 | 11.1 | 11.0 | 11.0 | 11.1 |
| Entering absolute humidity % RH | 0.0086 | 0.0086 | 0.0085 | 0.0086 | 0.0087 | 0.0086 | 0.0086 |
| discharging absolute humidity % RH | 0.0081 | 0.0081 | 0.0080 | 0.0081 | 0.0080 | 0.0081 | 0.0081 |
| Indoor air volume CMM | 8.9 | 9.3 | 8.8 | 8.9 | 9.3 | 9.6 | 9.1 |
| Heating capacity kcal/h | 3992.9 | 4173.2 | 3921.8 | 3980.0 | 4154.2 | 4283.1 | 4084.2 |
| Heating capacity Btu/h | 15843.7 | 16559.4 | 15561.8 | 15792.7 | 16483.8 | 16995.5 | 16206.1 |

As is clear from the above table, the air conditioner with the liquid heating element according to the present invention generates greater heat by more than 1,000 kcal than a conventional air conditioner (power consumption: 2.5 kw, 2,041 kcal/h) in the sane condition of 2.5 kw power supply.

Having very high thermal efficiency and stability, the liquid heating element according to the present invention can be used in various heat management methods and systems. Although not specifically described herein, the liquid heating element can also be used to maintain a constant temperature in green house, ranches such as an aquafarm., and in other cooling or heating systems. While the present invention has been described in connection with what is presently considered to be the most practical and preferred embodiment, those skilled in the art will appreciate that various modifications, additions and substitutions are possible, without departing from the scope and spirit of the invention as disclosed in the accompanying claims, including the full scope of equivalents thereof.

INDUSTRIAL APPLICABILITY

The solid ingredient A, liquid ingredient B and liquid heating element according to the present invention can be produced at low costs because the required components are readily available at low costs. The liquid heating element is stable and unflammable. Also, the liquid heating element can be easily delivered and kept. Since the liquid heating element directly generates heat like microwaves and super high magnetic field, it has superior thermal efficiency. When compared to a nichrome heating element, the liquid heating element reduces the power consumption by almost half.

The liquid heating element according to the present invention can be utilized in various heat management methods and systems.

Having high thermal efficiency, the liquid heating element according to the present invention saves energy and is thus advantageous for the protection of environment.

The invention claimed is:

1. A solid ingredient A produced by heating activated carbon, kaolin or diatomaceous earth, copper sulfide and phosphoric acid (H3PO4) to a temperature ranging from 1,000 to 1,200° C.

2. The solid ingredient A according to claim 1, wherein said activated carbon is in an amount of 25 to 70 parts by weight and kaolin or diatomaceous earth, copper sulfide and phosphoric acid are added in amounts varying depending on the amount of activated carbon.

3. The solid ingredient A according to claim 2, wherein 3 to 20 parts by weight of kaolin or diatomaceous earth, 4 to 20 parts by weight of copper sulfide and 55 to 110 parts by weight of phosphoric acid are added based on 40 parts by weight of activated carbon and heated.

4. The solid ingredient A according to claim 1, wherein said activated carbon, kaolin or diatomaceous earth, copper sulfide and phosphoric acid are mixed together and left for a predetermined period of time before being heated.

5. The solid ingredient A according to claim 1, wherein said activated carbon, kaolin or diatomaceous earth, copper sulfide and phosphoric acid are heated in the substantial absence of oxygen.

6. A liquid ingredient B produced by mixing a solid ingredient A with silicon powder and water and heating the mixture.

7. The liquid ingredient B according to claim 6, wherein 5 to 35 parts by weight of silicon powder and 300 to 850 parts by weight of water are added based on 30 parts by weight of said solid ingredient A.

8. The liquid ingredient B according to claim 6, wherein said solid ingredient A, silicon powder and water are heated at a temperature ranging from 90 to 110° C.

9. A liquid heating element produced by mixing a liquid ingredient B with ethylene glycol, leaving the mixture for a predetermined period of time and filtering the mixture.

10. The liquid heating element according to claim 9, wherein 30 to 50 parts by weight of ethylene glycol is added based on 650 parts by weight of the liquid ingredient B.

11. The liquid heating element according to claim 9, wherein said mixture of the liquid ingredient B with ethylene glycol is left for 15 to 30 hours.

12. A method for producing a liquid heating element, which comprises the steps of:
preparing a solid ingredient A by heating activated carbon, kaolin or diatomaceous earth, copper sulfide and phosphoric acid (H3PO4) to a temperature ranging from 1,000 to 1,200° C.;
preparing a liquid ingredient B by mixing the solid ingredient A with silicon powder and water and heating the mixture;
preparing a liquid heating element by mixing the liquid ingredient B with ethylene glycol in a predetermined ratio and leaving the mixture for a predetermined period of time; and
filtering the mixture.

13. The method according to claim 12, wherein said step of preparing the solid ingredient A includes: grinding a solid obtained during the heating step.

14. The method according to claim 12 wherein said step of preparing the solid ingredient A further includes mixing the activated carbon, kaolin or diatomaceous earth, copper sulfide and phosphoric acid for predetermined period of time before heating.

15. The method according to claim 12, wherein said activated carbon is added in an amount of 25 to 70 parts by weight and kaolin or diatomaceous earth, copper sulfide and phosphoric acid are added in amounts varying depending on the amount of activated carbon.

16. The method according to claim 12, wherein 3 to 20 parts by weight of kaolin or diatomaceous earth, 4 to 20 parts by weight of copper sulfide and 55 to 110 parts by weight of phosphoric acid are added based on 40 parts by weight of said activated carbon.

17. The method according to claim 12, wherein said activated carbon, kaolin or diatomaceous earth, copper sulfide and phosphoric acid are heated in the substantial absence of oxygen.

18. The method according to claim 13, wherein said grinding step grinds a solid obtained during the heating step into particles of less than 10 μm.

19. The method according to claim 12, wherein 5 to 35 parts by weight of silicon powder and 300 to 850 parts by weight of water are added based on 30 parts by weight of said solid ingredient A.

20. The method according to claim 12, wherein said solid ingredient A with silicon powder and water are heated at a temperature ranging from 90 to 110° C.

21. The method according to claim 12, wherein said step of leaving the mixture of the liquid ingredient B with ethylene glycol includes adding 30 to 50 parts by weight of ethylene glycol based on 650 parts by weight of the liquid ingredient B.

22. The method according to claim 12, wherein said step of leaving the mixture of the liquid ingredient B with ethylene glycol lets the mixture be left for 15 to 30 hours before filtration.

23. A liquid heating element produced by the method according to claim 12.

24. A heat management method using a liquid heating element produced by the method according to claim 12.

25. A heat management system using a liquid heating element produced by the method according to claim 12.

* * * * *